US012775675B1

(12) United States Patent
Itkin

(10) Patent No.: US 12,775,675 B1
(45) Date of Patent: Oct. 27, 2026

(54) COMPUTING CIRCUIT AND METHOD FOR FAST FOURIER TRANSFORM OPERATIONS USING DIMENSION SPLITTING AND PHYSICALLY INTEGRATED MEMORY

(71) Applicant: Next Silicon Ltd, Givatayim (IL)

(72) Inventor: Yaron Itkin, Tel Aviv (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/305,954

(22) Filed: Aug. 21, 2025

(51) Int. Cl.
*G06F 17/14* (2006.01)

(52) U.S. Cl.
CPC .................................. *G06F 17/142* (2013.01)

(58) Field of Classification Search
CPC ................................................ G06F 17/14–142
See application file for complete search history.

(56) References Cited

U.S. PATENT DOCUMENTS

| | | | | | |
|---|---|---|---|---|---|
| 5,093,801 | A * | 3/1992 | White | G06F 17/142 | 708/404 |
| 5,951,627 | A * | 9/1999 | Kiamilev | G06F 17/142 | 708/407 |
| 12,475,189 | B1 * | 11/2025 | Pisha | G06F 17/141 | |
| 2024/0320148 | A1 * | 9/2024 | Luise | G06F 13/404 | |

OTHER PUBLICATIONS

A. Coskun, et al., "Efficient Coefficient Store in Decomposed DFT/FFT Architectures for On-Board Processors", 31st AIAA International Communications Satellite Systems Conference, 2013. (Year: 2013).*

K. J. Jones, "High-throughput, reduced hardware systolic solution to prime factor discrete fourier transform algorithm", IEEE Proceedings (Computers and Digital Technical), vol. 137, issue 3, May 1990. (Year: 1990).*

(Continued)

*Primary Examiner* — Andrew Caldwell
*Assistant Examiner* — Huy Duong

(57) ABSTRACT

A computing circuit addresses memory hierarchy constraints in Fast Fourier Transform operations by implementing dimension splitting techniques that optimize twiddle factor storage within predetermined capacity limits. The computing circuit comprises a storage memory physically integrated with processing circuits that include hardware logic configured to decompose N-point FFT computations into multi-dimensional structures. A Dimension Splitting Twiddle Size function, implemented through hardware circuits, analyzes computational requirements and determines optimal memory utilization strategies that scale linearly with dimension size while applying optimization techniques including conjugate symmetry and component interchange methods. The processing circuit performs FFT computations for each dimension through an iterative process that interleaves dimensional computations with correction multiplication operations, ensuring proper mathematical combination of results as they become available. This hardware architecture enables processing of large FFT operations within constrained memory environments while achieving substantial reductions in computational overhead and memory access requirements compared to conventional implementations.

28 Claims, 2 Drawing Sheets

(56) References Cited

OTHER PUBLICATIONS

Figure 1:
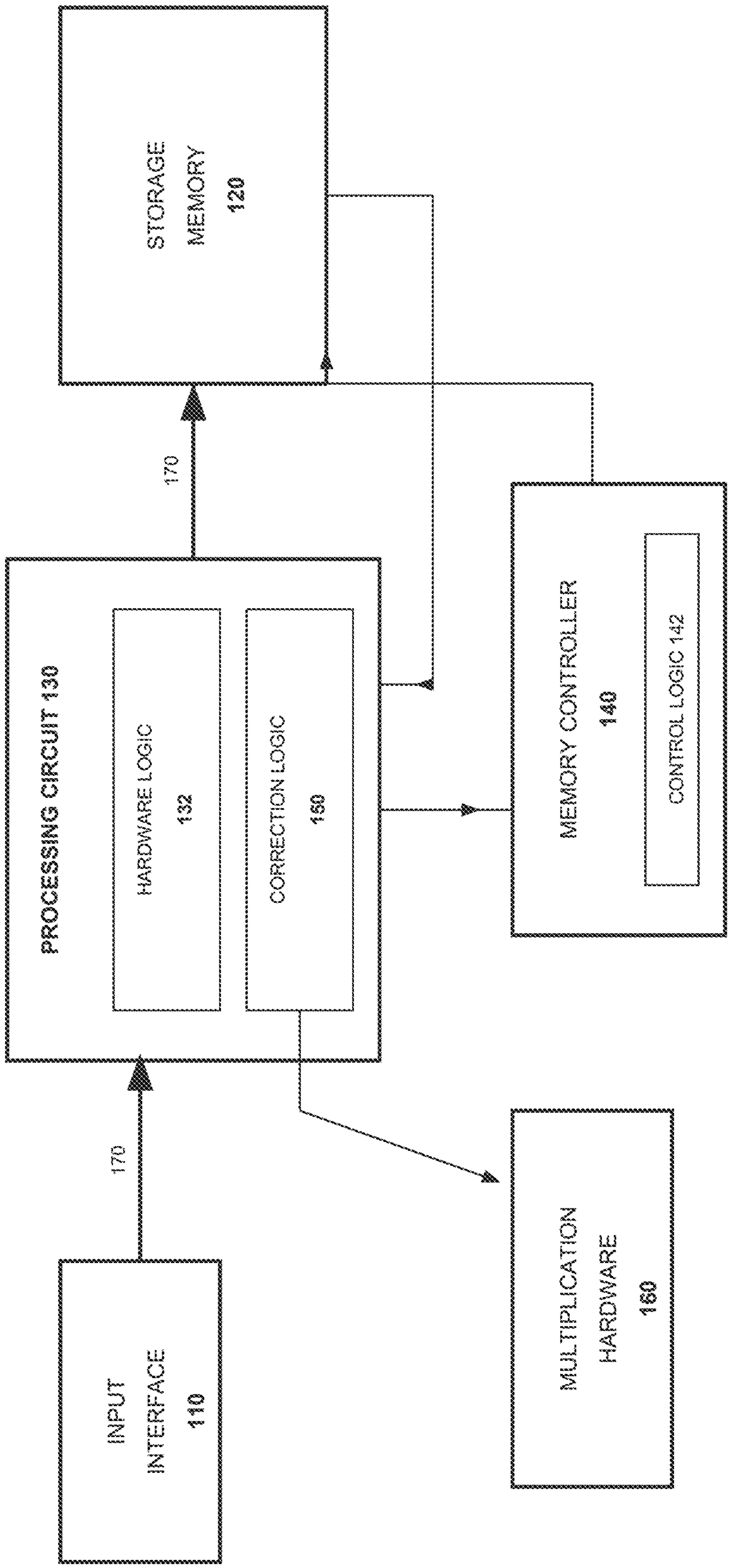

D. H. Bailey, "FFTs in External or Hierarchical Memory", Journal of Supercomputing, vol. 4, No. 1, Mar. 1990. (Year: 1990).*

K. P. Soman et al., "Recursive Variational Mode Decomposition Algorithm for Real Time Power Signal Decomposition", Procedia Technology, vol. 21, Nov. 2015. (Year: 2015).*

V. K. Dubey, "Read Only Memory (ROM)", Geeks for Geeks: Computer Organization Architecture, Jul. 23, 2025. (Year: 2025).*

S. Servodio et al., "Memory Efficiency Oriented Fine-Grain Representation and Optimization of FFT", MEMSYS '24: The International Symposium on Memory Systems, Sep. 2024. (Year: 2024).*

* cited by examiner

100

COMPUTING CIRCUIT AND METHOD FOR FAST FOURIER TRANSFORM OPERATIONS USING DIMENSION SPLITTING AND PHYSICALLY INTEGRATED MEMORY

FIELD AND BACKGROUND OF THE INVENTION

The present invention relates generally to digital signal processing circuits and methods, and more particularly to computing circuits and methods for efficiently performing Fast Fourier Transform (FFT) operations using optimized memory architectures and dimension splitting techniques.

FFT operations are fundamental tools widely used in digital signal processing, communications, image processing, scientific computing, and numerous other high-performance computing applications. The FFT operations convert time-domain signals into frequency-domain representations, enabling efficient analysis and processing of structured collections of information that require sophisticated mathematical analysis.

Conventional FFT operations require computation of coefficients known as "twiddle factors"-complex exponential values that are essential for the transformation process. Current approaches to managing twiddle factors present a fundamental trade-off that severely limits FFT performance and scalability.

A first approach involves computing twiddle factors repeatedly during algorithm execution whenever they are needed. This approach minimizes memory requirements while creating computational overhead that may cause processor stalls and severely degrades performance, particularly for large FFT operations where millions of twiddle factor computations may be required.

A second approach involves pre-computing and storing all required twiddle factors in memory for retrieval during FFT execution. While this approach eliminates repeated computation overhead, it creates enormous memory footprint requirements that can overwhelm available system resources. Some large-scale FFT operations require gigabytes of twiddle factor storage, often consuming up to 50% of available device memory. Moreover, even when sufficient memory is available, the memory bandwidth requirements for accessing these large twiddle factor tables often become the primary performance bottleneck, limiting the speed of FFT operations regardless of available computational resources.

SUMMARY OF THE INVENTION

According to some embodiments of the present invention, there is provided a computing circuit for computing Fast Fourier Transforms (FFTs), comprising an input interface configured to receive data for an N-point FFT computation, a storage memory physically integrated with the computing circuit and having a predetermined storage capacity, and a processing circuit comprising hardware logic configured to decompose the N-point FFT computation into a multi-dimensional FFT having at least two dimensions. A dimension splitting twiddle size (DSTS) function of each dimension does not exceed the predetermined storage capacity, thereby restructuring memory access requirements to match the physical memory architecture. The computing circuit further includes a memory controller comprising control logic configured to dynamically load twiddle factors corresponding to each of the dimensions into the storage memory, and the processing circuit further comprises correction logic configured to perform FFT computations for each dimension by directly accessing the twiddle factors from the physically integrated storage memory, and execute iterative correction multiplication operations using multiplication hardware to progressively integrate dimensional results through sequential correction steps applied between successive dimensional computations.

According to some embodiments of the present invention, there is provided a method for computing Fast Fourier Transforms (FFTs) using a computing circuit having storage memory physically integrated therewith, comprising receiving data for an N-point FFT computation via an input interface, determining a predetermined storage capacity of the physically integrated storage memory, decomposing the N-point FFT computation into a multi-dimensional FFT having at least two dimensions using hardware logic, dynamically loading twiddle factors into the storage memory using control logic, performing FFT computations for each dimension by directly accessing twiddle factors from the integrated storage memory, and executing correction multiplication operations to combine results from the multi-dimensional FFT to produce a result equivalent to the N-point FFT.

Optionally, the correction logic is configured to execute the correction multiplication operations iteratively between successive dimensional computations, such that for K dimensions, the correction logic performs K−1 correction multiplication steps, with each correction step applied immediately after completing each dimensional FFT computation except the final dimension, thereby creating an interleaved sequence of dimensional FFT computations and correction operations.

Optionally, the predetermined storage capacity is smaller than required for storing all twiddle factors of the N-point FFT, enabling efficient utilization of limited high-speed memory resources.

Optionally, the storage memory comprises hardware configured for single-cycle memory access operations, providing deterministic timing characteristics essential for real-time processing applications.

Optionally, the predetermined storage capacity is up to 10 kilobytes, representing an optimal balance between storage capacity and high-speed access characteristics within modern processor architectures.

Optionally, the hardware logic of the processing circuit is configured to implement Bailey's FFT algorithm for the decomposition, providing the framework for transforming single-dimensional FFT operations into multi-dimensional equivalents.

Optionally, the processing circuit is configured to decompose the N-point FFT computation into a two-dimensional FFT, representing the fundamental dimensional restructuring approach.

Optionally, the hardware logic comprises factorization circuitry configured to factorize the N-point FFT size into prime factors, and allocation circuitry configured to allocate each prime factor to a separate dimension of the multi-dimensional FFT, enabling processing of complex mathematical factorizations.

Optionally, the control logic of the memory controller is further configured to reconfigure the storage memory with different sets of twiddle factors during execution of the multi-dimensional FFT, providing dynamic adaptation capabilities.

Optionally, the processing circuit further comprises optimization logic configured to determine an optimal decomposition of the N-point FFT that minimizes computational operations required for the correction multiplication operations.

Optionally, the hardware logic is configured to recursively decompose one or more of the dimensions into smaller sub-dimensions when the DSTS function of each dimension exceeds the predetermined storage capacity, enabling processing of arbitrarily large FFT operations.

Optionally, the storage memory comprises storage circuitry configured to store twiddle factors as complex numbers comprising real and imaginary components in configurable floating point precision.

Optionally, the correction logic comprises arithmetic logic units (ALUs) configured to perform the correction multiplication operations with optimized computational efficiency.

Optionally, the control logic comprises pre-loading circuitry configured to load the storage memory during a planning phase prior to FFT execution, and retention circuitry configured to maintain the loaded twiddle factors for multiple FFT computations having the same dimensional structure.

Optionally, the processing circuit is configured to compute additional twiddle factors using combinations of twiddle factors stored in the storage memory, thereby enabling dimensions to exceed the predetermined storage capacity through computational generation.

Optionally, the processing circuit is configured to compute additional twiddle factors by multiplying a first twiddle factor corresponding to a first dimension with a second twiddle factor corresponding to a second dimension, implementing coefficient generation through hardware multiplication operations.

Optionally, the storage memory comprises partitioning hardware configured to partition the memory into multiple sections, each section storing twiddle factors for a different dimension of the multi-dimensional FFT.

Optionally, the hardware logic is configured to decompose the N-point FFT computation only when N exceeds the predetermined storage capacity, providing selective optimization based on computational requirements.

Optionally, the storage memory comprises configurable memory circuitry programmable during hardware manufacturing, compilation, or runtime execution, enabling flexibility across different deployment scenarios.

Optionally, the computing circuit is physically implemented as part of a digital signal processor (DSP) integrated circuit or graphics processing unit (GPU) integrated circuit, enabling integration with existing high-performance computing platforms.

Optionally, the computing circuit further comprises optimization circuitry configured to select a decomposition strategy that minimizes memory access operations while maintaining computational accuracy.

Optionally, the storage memory is physically implemented using static random access memory (SRAM) circuitry, providing optimal access speed and power consumption characteristics.

Optionally, the DSTS function reduces required storage through optimization techniques including negation properties that achieve ½ storage, conjugate symmetry properties that achieve ¼ storage, and complex multiplication properties that achieve ⅛ storage of the dimension size, with the DSTS function rounding up calculated storage requirements to accommodate these optimizations and calculating required storage as a square root of the dimension size when additional twiddle factors are computed through combinations of stored values.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
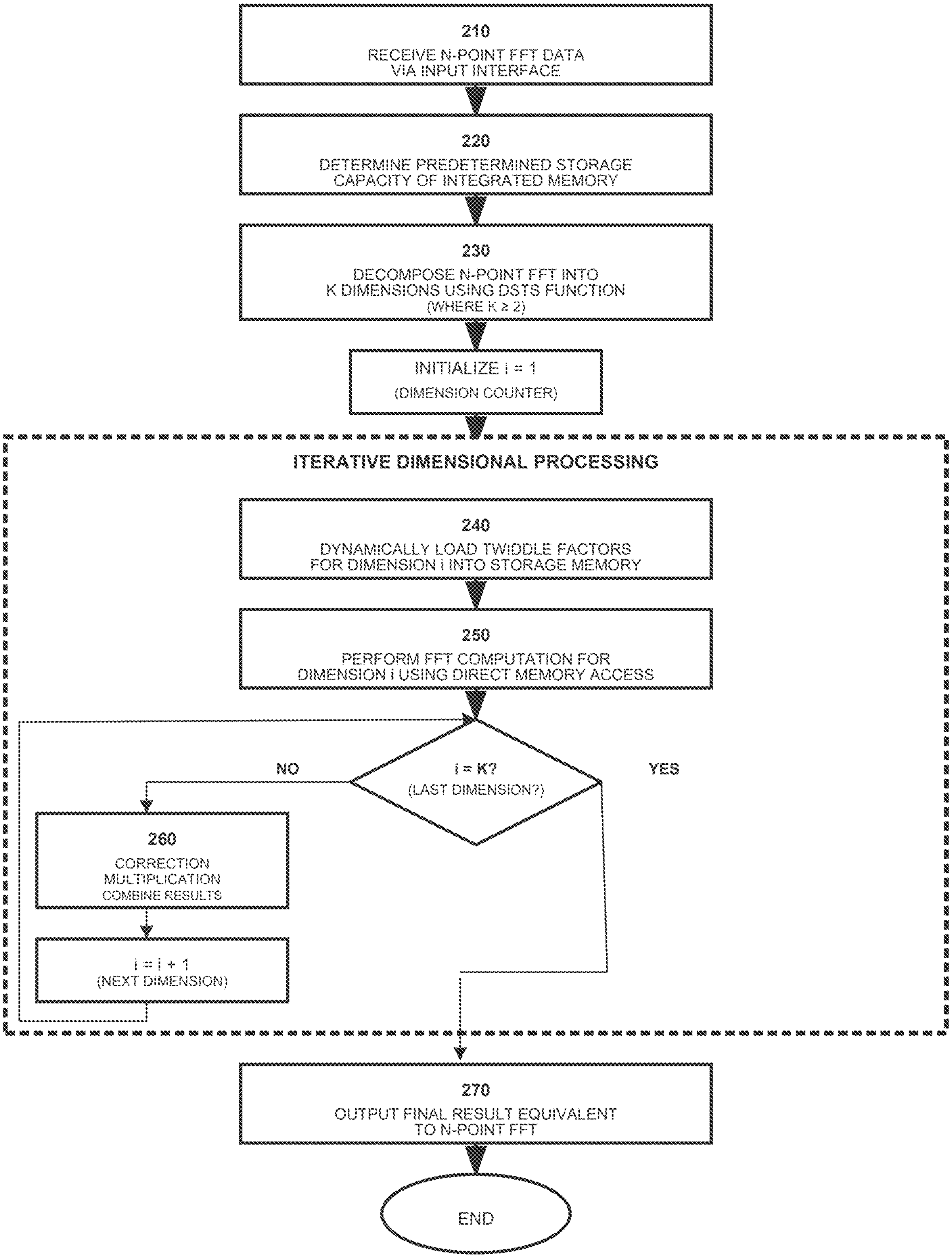

In the drawings:

FIG. 1 is a schematic block diagram illustrating a computing circuit for performing Fast Fourier Transform operations according to an embodiment of the present invention; and FIG. 2 is a flowchart diagram illustrating a method for computing Fast Fourier Transforms using dimension splitting techniques according to an embodiment of the present invention.

DESCRIPTION OF SPECIFIC EMBODIMENTS OF THE INVENTION

The present invention relates to digital signal processing circuits and methods for efficiently performing Fast Fourier Transform (FFT) operations using optimized memory architectures and dimension splitting techniques.

Modern processors include small amounts of ultra-high-speed memory (cache, scratch-pad memory, or configurable Look-Up Tables) that deliver data at processor speeds. However, these fast memory systems typically provide only kilobytes of storage, while large FFT operations require gigabytes of coefficient data.

This creates a fundamental architectural mismatch between FFT algorithm requirements and available high-performance memory resources. Large-scale FFT computations require gigabytes of coefficient data, while high-speed memory systems provide only kilobytes of storage capacity. Existing FFT implementations cannot effectively bridge this gap, forcing designers to choose between computational inefficiency (repeated twiddle factor computation) or memory inefficiency (massive storage requirements that exceed fast memory capacity).

Traditional FFT operations further exacerbate these problems with random or scattered access to twiddle factor data, creating cache-unfriendly memory access patterns that fail to capitalize on spatial and temporal locality principles. These inefficient access patterns result in frequent cache misses and memory stalls, degrading overall system performance.

Existing optimization techniques provide only limited solutions to these challenges. Some approaches attempt to optimize memory access patterns through data restructuring or algorithm modifications, but generally provide only incremental improvements and fail to address the core mismatch between algorithm memory requirements and available fast memory capacity. Other approaches focus on computational optimizations that reduce total required operations, but still face the fundamental trade-off between computation and memory overhead.

These limitations become particularly problematic in resource-constrained computing environments, such as embedded systems, mobile devices, and signal processing hardware, where both computational resources and memory capacity are strictly limited. These applications often require high-performance FFT operations but cannot accommodate the memory footprint or computational overhead of traditional implementations.

There remains a significant need for FFT computing approaches that can effectively utilize limited high-speed memory resources available in modern processor architectures while maintaining computational efficiency and accuracy.

Embodiments of the present invention address critical engineering limitations in contemporary computing architectures where the fundamental mismatch between processor computational capabilities and memory system performance creates severe bottlenecks in signal processing applications. Modern computing systems face an increasingly challenging engineering constraint known as the "memory wall," where processors execute computational operations at multi-gigahertz frequencies while memory systems provide data at substantially lower effective rates due to access latency and bandwidth limitations.

Contemporary computing platforms implement memory hierarchies where optimal performance characteristics are available only within severely constrained capacity environments. High-performance processors provide memory resources such as cache systems, scratch-pad memory, and configurable Look-Up Tables that deliver single-cycle access performance but impose strict capacity limitations measured in kilobytes rather than the megabytes or gigabytes that traditional computational approaches require. This hardware reality creates fundamental engineering challenges where achieving optimal computational efficiency requires designing system architectures that operate effectively within these capacity constraints rather than attempting to overcome them via slower external memory access.

Embodiments of the present invention addresses engineering opportunities created by hardware architectures that provide configurable memory resources such as configurable Look-Up Table memory resources. These LUT memory systems deliver high-speed access capabilities while maintaining configurability that enables the computational optimization approach described herein. Traditional implementations designed for conventional processors could not exploit these architectural advantages because the required memory resources, such as LUT memory resources, were not available, explaining why the computational restructuring approach represents a technological advancement enabled by specific hardware capabilities rather than a straightforward extension of existing techniques.

These embodiments may also address requirements for computational energy efficiency, directly targeting the compute-per-power ratio that determines practical deployment feasibility in power-constrained applications. By eliminating redundant computational operations while minimizing memory access overhead, the system achieves superior energy efficiency compared to alternative approaches that either waste energy through repeated calculations or sacrifice performance via inefficient memory utilization. This energy efficiency advantage stems from architectural alignment between computational workflows and available hardware resources rather than brute-force scaling approaches that characterize conventional implementations.

Practical engineering analysis demonstrates the efficiency improvements achievable using the hardware architecture approach.

For a representative 1,048,576-point FFT operation, traditional Cooley-Tukey implementation requires 20 iterative processing steps corresponding to the binary logarithm of the operation size. While the total number of unique twiddle factors required is approximately N, storage-constrained implementations cannot accommodate all factors in high-speed memory simultaneously. This forces repeated computation of twiddle factors across the 20 processing stages, resulting in $N \times \log_2(N)$ coefficient computations, totaling approximately 20,971,520 computational operations for this example. The present invention reduces this computational burden to approximately 1,048,576 operations through dimension splitting that enables efficient utilization of limited storage capacity, representing a twenty-fold improvement in computational efficiency while simultaneously reducing memory requirements by three orders of magnitude.

Contemporary computing systems implement memory hierarchies where the fastest access speeds are available only within severely constrained capacity limits. Hardware architectures described herein provide configurable memory that deliver single-cycle access performance but typically offer storage capacity measured in kilobytes rather than the megabytes or gigabytes that traditional FFT implementations would require. This hardware reality creates an engineering constraint where optimal performance may be achieved only by designing computational workflows that operate within these capacity limitations rather than attempting to overcome them via external memory access that introduces performance penalties.

In some embodiments, predetermined storage capacity is configured across a practical engineering range from approximately 1 kilobyte to 10 kilobytes, depending on the specific memory resources such as LUT memory resources available in the target hardware platform. The lower bound of 1 kilobyte represents the minimum capacity necessary to achieve meaningful computational efficiency improvements for typical operations, while the upper bound of 10 kilobytes provides enhanced flexibility for complex processing strategies while maintaining the high-speed access characteristics that enable performance optimization.

The embodiments address these hardware constraints via systematic restructuring of computational workflows to match available memory architecture rather than working against hardware limitations. This engineering approach transforms the apparent capacity constraint into an optimization opportunity by recognizing that intelligent organization of computational operations can achieve superior performance within limited memory resources compared to conventional approaches that require much larger memory allocations.

In some embodiments of the present invention, a Dimension Splitting Twiddle Size (DSTS) function is implemented in hardware logic circuits that serve as the central coordination mechanism linking Bailey's algorithm decomposition capabilities with optimization techniques to achieve optimal memory utilization.

Bailey's FFT algorithm, as described in Bailey, D. H. (1990), enables multi-dimensional decomposition by expressing an N-point FFT as a product of smaller FFTs. The DSTS function calculates the storage requirement for each dimension as DSTS (d)=optimization_factor×d, where d is the dimension size and optimization_factor accounts for optimizations such as conjugate symmetry. While d is approximately VN for a two-dimensional decomposition of an N-point FFT, the DSTS function operates linearly with respect to each individual dimension size d. This linear relationship ensures that storage requirements scale predictably with dimension size while enabling the application of various optimization techniques to reduce actual memory consumption.

The DSTS function operates as the intelligent decision-making component that analyzes computational requirements using Bailey's algorithmic framework, then applies appropriate optimization techniques (such as conjugate symmetry, negation properties, and combinations) to determine minimal storage requirements for each dimension, ensuring that the complete integrated system operates within available hardware memory constraints.

Bailey's algorithm implementation works in systematic coordination with the DSTS function to create an integrated optimization system. When the hardware logic 132 receives an FFT computation request, Bailey's algorithm provides the framework for decomposition possibilities, while the DSTS function evaluates each potential decomposition strategy against available storage capacity and optimization opportunities. For example, when processing the 644,972,544-point FFT factorized as (215)× (39), Bailey's algorithm identifies the dimensional structure possibilities, the DSTS function determines that each dimension can be further optimized using conjugate symmetry properties to achieve quarter-size storage, and the hardware optimization circuits implement the coordinated solution that combines algorithmic decomposition with storage reduction to achieve optimal memory utilization.

The hardware architecture implements several storage optimization techniques that reduce actual memory requirements while maintaining computational completeness. The hardware logic recognizes when computational coefficients share relationships that enable efficient storage strategies via circuit analysis rather than software computation. The hardware implements logic circuits that analyze coefficient relationships during storage optimization and recognize when certain coefficient pairs share properties that enable memory reduction. Specifically, the hardware recognition circuits identify coefficient pairs where one value represents the negative of another, enabling storage reduction to half the naive requirement by storing only one coefficient and generating its negative counterpart via negation circuits rather than requiring separate storage locations.

Similarly, the hardware architecture may include circuits that recognize conjugate relationships where coefficients $W\_N_k$ and $W\_N_{(N-k)}$ share properties that allow quarter-size storage via hardware-implemented optimization logic. The system also implements hardware circuits that recognize when certain coefficients can be generated via multiplication operations involving stored values, enabling one-eighth storage requirements via strategic hardware design rather than software-based generation.

The hardware architecture enables engineering tradeoffs between storage consumption and computational overhead via logic circuits. When the system requires a coefficient $W\_N_k$ where N can be expressed as the product A×B, hardware circuits can compute the required value as the product $W\_A_i \times W\_NB_j$ where k=iA+jA, hence representation of all N values require i from 0 to A−1 and j from 0 to B−1, implementing the required relationship via multiplication hardware rather than requiring storage of the complete coefficient set. This hardware implementation enables replacement of storage requirements for 1024 coefficient values with storage for only 64 values when appropriate relationships exist, requiring one additional hardware multiplication operation per coefficient access while achieving sixteen-fold memory reduction. The optimal balance between storage consumption and computational overhead is determined via hardware analysis circuits that evaluate available memory capacity and computational resources during system configuration.

The hardware architecture enables engineering tradeoffs between storage consumption and computational overhead via logic circuits. When the system requires a coefficient W_N^k where N can be expressed as the product A×B, hardware circuits can compute the required value as the product W_A^i×W_N^j where k=i+jA, hence representation of all N values requires i from 0 to A−1 and j from 0 to B−1. This hardware implementation enables replacement of storage requirements for N coefficient values with storage for A values of W_A coefficients plus B values of W_N coefficients, requiring one additional hardware multiplication operation per coefficient access while achieving significant memory reduction when A and B are substantially smaller than N.

As used herein, according to embodiments of the invention, the term "twiddle factors" refers to complex exponential values of the form W_N^k=e^(−j2πk/N) that are required for Fast Fourier Transform computations, where N represents the size of the FFT operation, k represents the specific coefficient index, and j represents the imaginary unit. These coefficients represent the computational elements that enable frequency domain transformation of time-domain or spatial-domain input data. The negative sign in the exponent is essential for proper FFT computation and distinguishes forward from inverse transform operations.

As used herein, according to embodiments of the invention, the term "computing circuit" refers to an integrated hardware system comprising multiple interconnected electronic components designed to perform Fast Fourier Transform computations via coordinated operation of processing elements, memory systems, and control logic.

As used herein, according to embodiments of the invention, the term "storage memory" refers to high-speed memory resources that are physically integrated within the computing circuit and allocated for storing twiddle factors required for FFT operations, at least part of the time. This memory system provides rapid access capabilities while maintaining predetermined capacity limitations that enable optimal performance characteristics via elimination of external memory access penalties.

As used herein, according to embodiments of the invention, the term "physically integrated" refers to the implementation approach where memory and processing components are manufactured on the same semiconductor substrate or within the same integrated circuit package, enabling high-speed data transfer between components while eliminating signal propagation delays and bandwidth limitations associated with external memory systems.

As used herein, according to embodiments of the invention, the term "predetermined storage capacity" refers to the fixed memory allocation within the storage memory that establishes the boundary conditions for twiddle factor storage and governs the dimension splitting optimization strategies. This capacity represents a design parameter that can be configured during manufacturing, compilation, or runtime phases but remains constant during computational operations to enable predictable timing and performance characteristics.

As used herein, according to embodiments of the invention, the term "Dimension Splitting Twiddle Size (DSTS) function" refers to the hardware-implemented logic that analyzes FFT computational requirements and determines the optimal storage allocation for each dimension based on properties of twiddle factors and available memory capacity constraints. This function represents a technological innovation that enables efficient utilization of limited high-speed memory resources via intelligent organization of computational workflows.

As used herein, according to embodiments of the invention, the term "multi-dimensional FFT" refers to the computational structure created when a single large FFT operation is mathematically restructured into multiple smaller FFT operations, each corresponding to a specific dimension, where the combined results of all dimensional computations produce output mathematically equivalent to the original single-dimensional FFT via correction multiplication operations.

As used herein, according to embodiments of the invention, the term "processing circuit" refers to the hardware subsystem within the computing circuit that contains the logic circuits responsible for analyzing FFT computational requirements, implementing dimension splitting strategies, and coordinating the operations required for each dimensional computation via electronic components.

As used herein, according to embodiments of the invention, the term "hardware logic" refers to the electronic circuits within the processing circuit that implement the dimension splitting analysis and optimization algorithms via logic gates, computational units, and control circuits rather than software programs executing on general-purpose processors. This hardware implementation provides deterministic timing characteristics and optimal performance via purpose-built electronic components.

As used herein, according to embodiments of the invention, the term "correction logic" refers to the hardware circuits within the processing circuit that coordinate the execution of dimensional FFT computations and manage the iterative correction multiplication process required to combine dimensional results. The correction logic includes computational circuits that perform individual dimensional FFT operations by accessing twiddle factors from the storage memory, timing coordination circuits that sequence the dimensional computations, and control circuits that trigger correction multiplication operations after each dimensional computation completes. This hardware subsystem ensures that the multi-dimensional FFT decomposition produces results mathematically equivalent to the original single-dimensional FFT through proper coordination of dimensional processing and correction operations.

As used herein, according to embodiments of the invention, the term "memory controller" refers to the hardware subsystem responsible for managing the storage and retrieval of twiddle factors within the storage memory via addressing circuits, data path controllers, and timing control mechanisms that ensure optimal utilization of available storage capacity while maintaining data integrity.

As used herein, according to embodiments of the invention, the term "control logic" refers to the electronic circuits within the memory controller that implement the dynamic loading strategies for twiddle factors, manage memory allocation and addressing operations, and coordinate data transfer between computational components and the storage memory via automated hardware control mechanisms.

As used herein, according to embodiments of the invention, the term "multiplication hardware" refers to the arithmetic circuits designed specifically for performing the correction multiplication operations required to combine results from multi-dimensional FFT computations, comprising physical multiplier circuits, accumulator units, and associated control logic optimized for the operations involved in the correction process.

As used herein, according to embodiments of the invention, the term "data paths" refers to the physical interconnections between hardware components within the computing circuit, comprising electrical conductors, buses, and switching elements that enable coordinated data transfer between processing elements, memory systems, and control circuits while maintaining the timing and bandwidth requirements for efficient FFT computation.

As used herein, according to embodiments of the invention, the term "input interface" refers to the hardware subsystem that receives external data for FFT computation and provides the necessary signal conditioning, data formatting, and electrical interface functions to prepare input information for processing by the downstream computational components within the computing circuit.

As used herein, according to embodiments of the invention, the term "single-cycle memory access operations" refers to the hardware capability where data retrieval from the storage memory completes within exactly one clock cycle of the computing circuit, eliminating wait states and providing deterministic timing characteristics that enable maximum computational throughput via guaranteed memory access performance.

As used herein, according to embodiments of the invention, the term "Look-Up Table (LUT)" refers to a type of high-speed memory architecture that provides rapid access to pre-computed values via direct addressing mechanisms, typically implemented in hardware platforms where configurability and single-cycle access characteristics enable the storage and retrieval optimization techniques described according to embodiments of this invention.

As used herein, according to embodiments of the invention, the term "Bailey's FFT algorithm" refers to the specific framework for transforming single-dimensional FFT operations into multi-dimensional equivalents via systematic restructuring of computational relationships, providing the algorithmic foundation for the dimension splitting approach implemented in the hardware logic circuits.

As used herein, according to embodiments of the invention, the term "configurable memory circuitry" refers to memory hardware that can be programmed or reconfigured with different twiddle factor sets during various phases of system operation, including manufacturing configuration, compilation-time optimization, or runtime adaptation, enabling flexibility in storage organization while maintaining high-speed access characteristics.

As used herein, according to embodiments of the invention, the term "hardware-implemented optimization" refers to the approach where computational efficiency improvements are achieved via electronic circuits and hardware components rather than software algorithms executing on general-purpose processors, providing superior performance characteristics via purpose-built hardware design.

As used herein, according to embodiments of the invention, the term "memory hierarchy constraints" refers to the fundamental engineering limitations in contemporary computing architectures where optimal memory access performance is available only within severely limited capacity environments, creating the technical challenges that the present invention addresses via strategic hardware architecture design.

High-performance computing applications requiring Fast Fourier Transform operations face critical computational bottlenecks due to massive memory access overhead. Traditional FFT implementations either repeatedly compute essential transformation coefficients during execution (causing processor stalls and computational inefficiency), or pre-cache all required coefficients in memory (creating enormous memory footprints that can overwhelm available system resources). Both approaches severely limit computational throughput and prevent efficient scaling of FFT operations on modern hardware platforms.

Contemporary processors feature small amounts of premium memory resources such as on-chip cache or configurable memory blocks, but these premium memory tiers have extremely limited capacity. While these fast memory systems can deliver data at processor speeds, they typically provide only kilobytes of storage, whereas large-scale FFT computations require gigabytes of coefficient data. This creates a fundamental computational architecture mismatch between processing requirements and available high-performance memory resources.

Embodiments of this invention implement a computing architecture featuring storage memory directly integrated with custom processing logic circuits. Rather than accepting memory limitations as constraints, the system redesigns the computational approach by breaking large FFT operations into smaller processing tasks that efficiently utilize available fast memory. The hardware automatically restructures data access patterns to match the physical memory hierarchy, converting memory bottlenecks into computational acceleration opportunities.

Referring now to FIG. 1, the computing circuit 100 comprises several interconnected hardware components that implement the computational restructuring approach via coordinated engineering design. Understanding this hardware architecture provides the foundation for comprehending how the various optional engineering enhancements modify or extend the core technological capabilities.

The processing circuits analyze incoming computational workloads and dynamically partition them into smaller parallel processing tasks, each sized to fit within the integrated memory capacity. A memory management controller orchestrates efficient data loading strategies, ensuring optimal utilization of the fast memory tier, while custom computational logic circuits perform parallel processing operations and combine partial results to deliver equivalent computational outcomes. This hardware-centric computational architecture transforms FFT processing from memory-bound operations into compute-optimized workflows with highly efficient data access patterns. The result delivers dramatic performance improvements-20× reduction in processing overhead while requiring 1000× less memory bandwidth than conventional approaches. The solution enables practical deployment of large-scale FFT computations on resource-constrained hardware platforms while maintaining computational accuracy and achieving superior energy efficiency for high-performance computing applications.

An input interface 110 receives data for N-point FFT computations and provides signal conditioning and data formatting functions via interface circuitry. The input interface 110 comprises physical input terminals and associated interface circuits that handle electrical signals representing input data from sources such as antenna arrays, sensor systems, or audio processing pipelines, providing the necessary electrical interface characteristics for integration with diverse signal sources.

A storage memory 120 is physically integrated with the computing circuit 100 and implements a predetermined storage capacity designed to accommodate computational coefficients for the dimension splitting approach. The storage memory 120 comprises physical memory storage elements, addressing circuitry, and read/write control mechanisms that enable high-speed data access while eliminating latency penalties associated with external memory systems. The physical integration approach ensures that all coefficient access operations occur within the fastest memory tier available in the computing system.

In some embodiments, the storage memory 120 comprises static random access memory (SRAM) circuitry that provides the optimal balance between access speed and power consumption for the dimension splitting approach. SRAM implementation offers several technical advantages over alternative memory technologies in this context. Unlike dynamic random access memory (DRAM) which requires periodic refresh operations that could interfere with the deterministic timing requirements of FFT computations, SRAM maintains data stability without refresh cycles, ensuring predictable memory access patterns essential for real-time processing applications.

The SRAM circuitry optionally operates at clock frequencies matching the processing circuit, typically 1-10 GHz, with access latencies of 1-2 nanoseconds. The SRAM circuitry enables true single-cycle memory access operations because SRAM cells respond to address changes within the same clock cycle, eliminating the address setup and data hold timing complications associated with other memory technologies. Furthermore, SRAM power consumption characteristics align well with the dimension splitting approach because power is consumed only during active read/write operations, while the storage cells maintain their contents with minimal static power consumption between computational phases.

A processing circuit 130 comprises hardware logic 132 configured to decompose N-point FFT computations into multi-dimensional structures having at least two dimensions via computational analysis circuits. The hardware logic 132 includes physical logic gates, computational units, and control circuits that implement decomposition algorithms in hardware rather than software executing on general-purpose processors. The hardware logic 132 operates according to the DSTS function implementation via circuits, ensuring that the storage requirements for each dimension do not exceed the predetermined storage capacity of the storage memory 120.

The processing circuit 130 further comprises correction logic 150 that performs computational operations for each dimension by directly accessing coefficients from the storage memory 120 via hardware connections. The correction logic 150 includes hardware circuits that provide deterministic timing characteristics essential for real-time processing applications, eliminating the timing variability associated with software-based implementations.

A memory controller 140 comprises control logic 142 that dynamically loads computational coefficients corresponding to each dimension into the storage memory 120 via memory management circuits. The control logic 142 includes physical addressing circuits, data path controllers, and timing control mechanisms that ensure optimal utilization of storage capacity while maintaining data integrity via hardware-implemented management rather than software-based memory allocation.

Optionally, the control logic 142 comprises dynamic reconfiguration circuitry configured to perform real-time switching between multiple twiddle factor configurations during active FFT computation execution, enabling adaptive optimization based on changing dimensional requirements within a single computational operation. The dynamic reconfiguration circuitry can transition the storage memory 120 from a first configuration optimized for a first dimension to a second configuration optimized for a second dimension while maintaining computational continuity via buffer management circuits that preserve intermediate results during configuration transitions.

This real-time reconfiguration capability is particularly advantageous when processing FFT operations with heterogeneous dimensional structures, such as computations involving mixed prime factorizations where different dimensions require distinct coefficient sets that cannot be efficiently stored simultaneously within the predetermined storage capacity. The reconfiguration process completes within predetermined timing windows that align with the computational phases of Bailey's algorithm execution, ensuring that memory reconfiguration overhead does not introduce computational stalls or timing violations.

When the hardware platform supports sufficiently rapid memory reconfiguration operations, typically completing within 1-10 clock cycles, this dynamic approach enables processing of complex multi-dimensional FFT operations that would otherwise exceed available storage capacity via sequential optimization of memory utilization for each dimensional computation phase, thereby extending the effective range of processable FFT sizes without requiring larger physical memory implementations.

M Multiplication hardware 160 executes iterative correction multiplication operations that progressively integrate dimensional results as they become available, applying correction factors between successive dimensional computations to maintain mathematical equivalence to the original N-point operation. The correction process operates in K−1 sequential steps for K dimensions, with each correction step applied immediately after completing each dimensional FFT computation except the final dimension. The multiplication hardware 160 comprises physical multiplier circuits, accumulator units, and associated control logic optimized for the specific operations required by the correction process, providing superior energy efficiency compared to general-purpose arithmetic logic units.

Optionally, the correction logic comprises arithmetic logic units (ALUs) configured to perform the correction multiplication operations with optimized computational efficiency. The ALUs implement specialized arithmetic operations that leverage the mathematical properties of the correction process to minimize computational overhead while maintaining accuracy.

Physical interconnections shown as data paths 170 provide communication channels between components, comprising electrical conductors, buses, and switching elements that enable coordinated operation while maintaining timing and bandwidth requirements for efficient computation. The data path architecture is designed to minimize signal propagation delays and power consumption while providing sufficient bandwidth to support the parallel computational operations enabled by the dimension splitting approach.

Optionally, complex factorization capabilities are implemented via hardware circuits that handle computations involving multiple distinct mathematical bases requiring separate processing treatments. This enhancement addresses practical deployment scenarios where computational sizes cannot be decomposed into uniform dimensional structures using single mathematical approaches, requiring sophisticated hardware analysis and allocation circuits.

Consider a practical engineering example involving mixed mathematical factors where computation size 644,972,544 requires processing. This size factors as (2ˆ15)×(3ˆ9), requiring separate hardware configurations for powers-of-two and powers-of-three computational relationships. The system maintains distinct configurations within the storage memory 120, with one hardware configuration storing coefficients optimized for the 2ˆ15 dimension and another storing coefficients optimized for the 3ˆ9 dimension via memory allocation circuits.

The hardware logic 132 may include factorization analysis circuitry that recognizes when computational sizes involve multiple mathematical bases and determines optimal allocation strategies for the available storage capacity via automated hardware analysis. For the 644,972,544 example, the factorization circuitry identifies that the size requires both binary and ternary mathematical processing, enabling the allocation circuitry to create separate dimensional computations that can be processed using distinct coefficient sets via hardware management.

Optionally, the hardware logic comprises factorization circuitry configured to factorize the N-point FFT size into prime factors, and allocation circuitry configured to allocate each prime factor to a separate dimension of the multi-dimensional FFT, enabling processing of complex mathematical factorizations.

Optionally, the memory controller 140 includes enhanced control logic that manages multiple distinct configurations within the storage memory 120 via memory partitioning circuits. For complex factorizations, the control logic 142 implements partitioning strategies that allocate separate memory regions to each mathematical base while maintaining optimal access characteristics for each configuration via addressing circuits. The control logic determines whether to implement dynamic reconfiguration between dimensional computations or static partitioning based on the relative sizes of the dimensional requirements and the reconfiguration capabilities of the memory system hardware.

Optionally, the predetermined storage capacity of the storage memory 120 may be deliberately configured to be smaller than the total storage required for storing all computational coefficients of the N-point operation via strategic hardware design choices. This architectural choice transforms apparent memory limitations into performance optimization opportunities via engineering design rather than accepting them as constraining factors.

The constraint-based approach provides several advantages beyond simple capacity optimization via hardware architecture design. The bounded storage requirements enable guaranteed timing characteristics and memory access patterns that would be impossible with unbounded storage requirements, providing deterministic system behavior essential for real-time processing applications. In automotive radar systems operating under strict real-time constraints, this predictability directly impacts system reliability and safety performance via hardware-guaranteed timing characteristics.

The energy efficiency advantages stem from limiting the total memory that must be managed and accessed during computational operations via hardware design choices, reducing both static power consumption associated with maintaining large memory arrays and dynamic power consumption associated with driving large memory structures. In mobile device implementations, this translates to extended battery life and enhanced user experience without sacrificing computational capability via strategic hardware architecture design.

Optionally, recursive decomposition capabilities are implemented via hardware circuits that extend beyond simple two-dimensional splitting to enable hierarchical processing of arbitrarily large computational operations. This recursive approach transforms the scalability limitations that constrain traditional implementations into systematic optimization opportunities via sophisticated hardware architecture design.

The recursive decomposition capability enables the hardware logic 132 to split computational operations directly into three or more dimensions when advantageous via analysis circuits, rather than being limited to binary decomposition strategies implemented in conventional systems. Consider a process for a computation of size 92,160, which factorizes as 2^11×3^2×5. The system evaluates each factor against the predetermined storage capacity to determine optimal decomposition strategies. If the storage memory can accommodate only 1024 coefficients (corresponding to 2^10), then the 2^11 dimension would require 2048 coefficients, exceeding available capacity. The hardware logic therefore applies recursive decomposition to split 2^11 into 2^10×2^1, where the 2^10 dimension exactly matches the storage capacity limit and the 2^1 dimension requires minimal storage. The remaining factors 3^2 and 5^1 each require significantly fewer coefficients than the storage limit, so they can be processed as separate dimensions without further decomposition. This constraint-driven analysis enables decomposition into four manageable dimensions of sizes 2^10, 2^1, 3^2, and 5^1 respectively, each fitting within the predetermined storage capacity. This multi-dimensional approach often provides more efficient storage utilization than repeated binary splitting while reducing the number of correction operations required via optimized hardware architecture design.

The recursive decomposition process enables hierarchical splitting where large computational operations are initially decomposed into manageable dimensions, which are then further subdivided when necessary via cascaded hardware analysis circuits. For instance, a 1,048,576-point computation initially decomposed into 1024×1024 dimensions can be further subdivided via recursive hardware logic, with each 1024-point dimension split into 32×32 sub-dimensions. This recursive approach enables processing of large computational operations while maintaining compatibility with constrained memory systems via sophisticated hardware architecture design.

Optionally, the hardware logic 132 includes optimization circuitry that analyzes engineering tradeoffs between memory utilization efficiency and computational complexity via analysis circuits. While deeper recursion enables processing of larger computational operations within fixed memory constraints, each level of decomposition adds correction operations that require additional coefficient computations via hardware multiplication circuits. The optimization circuitry determines optimal decomposition strategies based on available memory capacity, computational resources, and performance requirements via automated hardware analysis.

Optionally, the hardware logic is configured to recursively decompose one or more of the dimensions into smaller sub-dimensions when the DSTS function of each dimension exceeds the predetermined storage capacity, enabling processing of arbitrarily large FFT operations.

Optionally, the storage memory 120 may comprise hardware specifically configured for single-cycle memory access operations via memory cell design and addressing circuitry. This architectural feature provides deterministic timing behavior that proves valuable for high-performance computations in real-time processing systems via hardware-guaranteed access characteristics.

The single-cycle access capability enhances the correction logic 150 performance by eliminating memory access latency that would otherwise interrupt computational flow via hardware timing optimization. Since the DSTS function ensures that all required coefficients reside within the storage memory 120, every memory access operation can complete within a single clock cycle via hardware design, enabling maximum computational throughput via hardware architecture optimization.

This capability is valuable in systems where computations must complete within specific time windows to maintain synchronization with defined patterns via deterministic hardware timing. The guaranteed timing eliminates jitter that could compromise accuracy via hardware-implemented timing consistency, making this optional feature beneficial for safety-critical applications requiring precise timing control.

Optionally, the storage memory comprises hardware configured for single-cycle memory access operations, providing deterministic timing characteristics essential for real-time processing applications.

Optionally, the processing circuit 130 may be configured to compute additional computational coefficients using hardware-implemented combinations of coefficients stored in the storage memory 120, thereby enabling dimensions to exceed the predetermined storage capacity via computational generation implemented in hardware circuits. This approach leverages hardware-implemented relationships between coefficients to extend effective capacity beyond physical storage limits while maintaining the performance advantages of integrated high-speed memory access.

Optionally, the enhanced processing circuit 130 implements comprehensive coefficient generation techniques via hardware circuits that exploit multiple relationships simultaneously to achieve storage efficiency while maintaining computational accuracy. Beyond simple multiplication of coefficients from different dimensions, the system recognizes when required coefficients can be generated via combinations involving hardware-implemented optimization techniques applied via cascaded logic circuits.

The hardware-implemented combination approach may address the engineering challenge of extending effective storage capacity beyond physical memory limits via coefficient generation circuits. When the system requires a coefficient that exceeds available storage capacity, specialized analysis circuits determine whether the required value can be generated via multiplication of stored coefficients from different dimensions. The multiplication hardware implements this generation process by computing the product of two stored values W_A^i and W_N^j, where the addressing logic ensures that the mathematical relationship k=i+jA produces the required coefficient W_N^k via arithmetic circuits rather than software calculation.

Optionally, the processing circuit is configured to compute additional twiddle factors using mathematical combinations of twiddle factors stored in the storage memory, thereby enabling dimensions to exceed the predetermined storage capacity through computational generation.

Optionally, the processing circuit is configured to compute additional twiddle factors by multiplying a first twiddle factor corresponding to a first dimension with a second twiddle factor corresponding to a second dimension, implementing coefficient generation via hardware multiplication operations.

Optionally, the storage memory 120 may comprise configurable memory circuitry that can be programmed during different phases of system development and deployment via configuration hardware. These configuration options provide flexibility for optimizing performance across diverse applications while maintaining the fundamental hardware architecture advantages via adaptable hardware design.

Optionally, the configurable memory circuitry can be programmed with coefficient sets optimized for specific computational size ranges or dimensional decomposition strategies during semiconductor fabrication via programming circuits. This approach provides enhanced performance for targeted applications while reducing the complexity of runtime configuration systems via hardware customization during manufacturing.

During manufacturing phase programming, semiconductor fabrication equipment can configure the memory cells with predetermined coefficient sets using mask programming or electrical programming techniques, creating application-specific integrated circuits (ASICs) optimized for particular FFT size ranges. This manufacturing-time configuration eliminates runtime configuration overhead while providing maximum performance for fixed-function applications. Optionally, the storage memory comprises configurable memory circuitry programmable during hardware manufacturing. Optionally, compilation-phase configuration enables software development tools to analyze computational requirements and configure the storage memory 120 with optimal coefficient sets during program compilation via programmable hardware interfaces. This approach allows application-specific optimization while maintaining hardware flexibility for different software implementations via configurable hardware architecture.

Compilation-phase configuration enables software development environments to analyze target application requirements and program the configurable memory circuitry via hardware description language (HDL) synthesis tools or dedicated configuration interfaces. The compilation system determines optimal coefficient sets based on the statistical analysis of expected FFT operations within the target software, then generates configuration bitstreams that program the memory during system initialization.

Optionally, the storage memory comprises configurable memory circuitry programmable during program compilation.

Optionally, runtime configuration provides enhanced flexibility by enabling dynamic adaptation of memory structure to changing computational requirements during system operation via real-time programmable hardware circuits. The configurable memory circuitry can be reprogrammed in response to varying computational workloads encountered during operation via adaptive hardware control, ensuring optimal performance across diverse operational scenarios while maintaining the architectural advantages of integrated high-speed memory access.

Runtime configuration provides maximum operational flexibility via programmable memory interfaces that enable dynamic adaptation to varying computational workloads. The control logic 142 includes configuration registers and memory programming circuits that can modify stored coefficient sets in response to changing application requirements, enabling a single hardware platform to efficiently support diverse FFT computational profiles while maintaining the performance advantages of integrated high-speed memory access.

Optionally, the storage memory comprises configurable memory circuitry programmable during runtime execution, enabling flexibility across different deployment scenarios.

Optionally, the storage memory comprises partitioning hardware configured to partition the memory into multiple sections, each section storing twiddle factors for a different dimension of the multi-dimensional FFT.

The partitioning hardware enables efficient organization of coefficient data according to dimensional requirements, allowing simultaneous access to coefficients for different dimensions while maintaining optimal memory utilization. The partitioning strategy can be implemented statically during configuration or dynamically during operation, depending on the specific requirements of the computational workload.

Optionally, the hardware logic is configured to decompose the N-point FFT computation only when N exceeds the predetermined storage capacity, providing selective optimization based on computational requirements. This selective approach enables the system to operate efficiently across a wide range of FFT sizes, applying the dimension splitting optimization only when necessary while using conventional approaches for smaller computations that fit within available storage capacity. The hardware logic includes comparison circuits that evaluate the FFT size against storage capacity constraints and automatically select the appropriate computational approach.

Optionally, the DSTS function reduces required storage via mathematical optimization techniques including negation properties that achieve ½ storage, conjugate symmetry properties that achieve ¼ storage, and complex multiplication properties that achieve ⅛ storage of the dimension size, with the DSTS function rounding up calculated storage requirements to accommodate these mathematical optimizations and calculating required storage as a square root of the dimension size when additional twiddle factors are computed via combinations of stored values. The optimization techniques leverage fundamental properties of complex exponential functions to achieve significant storage reductions while maintaining computational accuracy. The negation properties recognize that W_N^k=−W_N^(k+N/2), enabling storage of only half the required coefficients. The conjugate symmetry properties utilize the relationship W_N^k=(W_N^(N−k))*, allowing quarter-size storage via complex conjugation operations. The complex multiplication properties enable generation of required coefficients via products of stored values, achieving eighth-size storage via computational synthesis. The one-eighth storage optimization is achieved through strategic utilization of the relationship between real and imaginary components of complex twiddle factors. The hardware recognition circuits identify when coefficient values can be generated by interchanging the real and imaginary parts of stored complex numbers, combined with appropriate sign adjustments. This technique leverages the mathematical properties of complex exponentials where certain twiddle factors share real and imaginary components that can be systematically reused, enabling the hardware to store only one-eighth of the naive coefficient requirement while maintaining computational completeness through real-imaginary component manipulation circuits.

Optionally, the storage memory comprises storage circuitry configured to store twiddle factors as complex numbers comprising real and imaginary components in configurable floating point precision. The configurable precision capability enables optimization of storage utilization and computational accuracy based on application requirements. Higher precision formats provide greater accuracy at the cost of increased storage requirements, while lower precision formats enable more efficient storage utilization with acceptable accuracy degradation for specific applications.

Optionally, the control logic comprises pre-loading circuitry configured to load the storage memory during a planning phase prior to FFT execution, and retention circuitry configured to maintain the loaded twiddle factors for multiple FFT computations having the same dimensional structure.

The pre-loading capability enables efficient amortization of configuration overhead across multiple computational operations, while the retention circuitry minimizes reconfiguration requirements for repetitive computational patterns. This approach is particularly beneficial for applications that perform multiple FFT operations with similar dimensional structures, such as signal processing pipelines or iterative algorithms.

The computing circuit architecture described herein may integrate with existing digital signal processor (DSP) and graphics processing unit (GPU) architectures commonly deployed in high-performance computing applications. When implemented within DSP integrated circuits, the storage memory 120 can utilize the dedicated on-chip memory resources such as L1 cache or specialized coefficient memory banks that DSP architectures provide for signal processing operations. The processing circuit 130 leverages DSP-optimized arithmetic logic units and multiply-accumulate (MAC) units to implement the correction multiplication operations with enhanced computational efficiency. In GPU implementations, the computing circuit utilizes the GPU's parallel processing architecture by implementing multiple instances of the processing circuit 130 across different GPU compute units, enabling simultaneous processing of multiple FFT operations or parallel processing of different dimensions within a single large FFT computation. The GPU's high-bandwidth memory subsystem supports efficient loading of coefficient data into the distributed storage memory instances, while the GPU's thread scheduling capabilities coordinate the correction multiplication operations across multiple processing elements.

Optionally, the computing circuit is physically implemented as part of a digital signal processor (DSP) integrated circuit or graphics processing unit (GPU) integrated circuit, enabling integration with existing high-performance computing platforms.

Optionally, the computing circuit further comprises optimization circuitry configured to select a decomposition strategy that minimizes memory access operations while maintaining computational accuracy.

Optionally, the storage memory is physically implemented using static random access memory (SRAM) circuitry, providing optimal access speed and power consumption characteristics.

Referring now to FIG. 2, the flowchart illustrates systematic implementation of the dimension splitting approach via coordinated hardware operational steps. The method builds upon the hardware architecture components depicted in FIG. 1 while providing algorithmic structure for practical deployment across the range of optional engineering enhancements described in the hardware embodiments.

The method begins at step 210 with receiving N-point computation data via the input interface 110 using interface hardware. When implemented using the computing circuit 100 of FIG. 1, this corresponds to the operation of input interface 110, which handles the electrical and logical aspects of accepting input data and preparing it for subsequent processing operations via interface circuits. The input data represents time-domain or spatial-domain information requiring transformation to frequency-domain representation via hardware-implemented computation.

The method proceeds to step 220, which involves determining the predetermined storage capacity of storage memory 120 that is physically integrated with computing circuit 100 via hardware capacity analysis. This determination step establishes the memory constraints that govern subsequent decomposition decisions via hardware-implemented analysis, including evaluation of factorization requirements and optimal configuration strategies. When implemented using the computing circuit 100, this step utilizes the known characteristics of the storage memory 120 to establish boundary conditions for the dimension splitting process via hardware parameter analysis.

At step 230 decomposition of the N-point computation is performed into a multi-dimensional structure having at least two dimensions using hardware logic 132 of the processing circuit 130 via decomposition circuits. This decomposition step represents the core engineering innovation where the hardware logic 132 analyzes computational requirements and determines how to restructure the operation to match physical memory architecture constraints via hardware analysis. The decomposition process ensures that the DSTS function of each dimension does not exceed the predetermined storage capacity via hardware-implemented constraint checking, including consideration of complex factorizations and recursive decomposition opportunities when beneficial.

The method continues to step 240, which involves dynamically loading computational coefficients corresponding to each of the dimensions into the storage memory 120 via control logic 142 of the memory controller 140. This loading step utilizes memory management circuits to transfer coefficient data from external sources or computational generation processes into the high-speed storage system via hardware data paths. When implemented using the computing circuit 100, this step orchestrates efficient placement of coefficient data within the storage memory 120 via hardware-controlled memory management, ensuring optimal utilization of limited storage capacity.

At step 250, the method performs computations for each dimension through an iterative process that interleaves dimensional FFT operations with correction multiplication steps. For each dimension except the last, the system: (a) performs the dimensional FFT computation by directly accessing coefficients from the physically integrated storage memory 120, and (b) immediately executes correction multiplication operations using multiplication hardware 160 to combine the dimensional result with previously processed dimensions. This iterative correction approach ensures that dimensional results are properly integrated as they become available, rather than accumulating all dimensional results before applying corrections. This computational step represents the primary processing phase where actual transformations are executed using coefficients optimally positioned within the high-speed memory system via hardware-optimized data access. When implemented using the computing circuit 100, this step is executed by the correction logic 150, which retrieves coefficients from the storage memory 120 and applies them in operations required for each dimensional computation via computational circuits, enabling hardware-implemented combination techniques when additional coefficients are required.

The method concludes at step 260 with executing iterative correction multiplication operations using the multiplication hardware 160, wherein correction factors are applied sequentially between each pair of successive dimensional computations, progressively building the final result through K−1 correction steps that maintain mathematical equivalence to the N-point operation. This final step performs operations that integrate dimensional results into cohesive output that maintains equivalence to the original single-dimensional operation via hardware-implemented correction logic. When implemented using the computing circuit 100, this step ensures that the decomposition and reconstruction process preserves computational accuracy while providing performance and memory utilization advantages enabled by the dimension splitting approach via coordinated hardware operation.

The correction multiplication process operates iteratively between successive dimensional computations rather than as a single final step. When decomposing an N-point FFT into K dimensions, the system performs K−1 correction multiplication steps, with each correction step executed immediately after completing the FFT computation for each dimension except the final one. This iterative approach ensures that dimensional results are properly combined as they become available, creating an interleaved sequence of dimensional FFT computations and correction operations. The hardware implements this through coordination logic that triggers correction multiplication hardware after each dimensional computation completes, maintaining computational flow while ensuring mathematical equivalence to the original N-point FFT.

Understanding how Bailey's algorithm, the DSTS function, and optimization techniques work as an integrated system requires examining their coordinated operation during FFT processing. Bailey's algorithm provides the foundational framework that identifies how large FFT operations can be decomposed into smaller dimensional structures that fit within available memory constraints. The DSTS function serves as the intelligent coordinator that evaluates each potential Bailey's algorithm decomposition against available storage capacity while simultaneously analyzing which optimization techniques can be applied to minimize storage requirements for each dimension. The optimization techniques (conjugate symmetry, negation properties, and combinations) represent the specialized hardware capabilities that the DSTS function can invoke to achieve storage reductions beyond what Bailey's algorithm decomposition alone would provide.

This integrated approach enables the system to process FFT operations that would be impossible using any single technique in isolation. For instance, a large FFT that exceeds storage capacity even after Bailey's algorithm decomposition can still be processed successfully when the DSTS function applies appropriate optimization techniques to reduce the storage requirements of each dimension below available capacity limits.

It is expected that during the life of a patent maturing from this application many relevant systems and methods will be developed and the scope of the terms defined above is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing circuit for computing Fast Fourier Transforms (FFTs), comprising:

an input interface configured to receive data for an N-point FFT computation;

a storage memory physically integrated with the computing circuit and having a predetermined storage capacity;

a processing circuit comprising hardware logic configured to decompose the N-point FFT computation into a multi-dimensional FFT having at least two dimensions, each dimension corresponding to a separate FFT computation requiring a respective set of twiddle factors, wherein a storage requirement determined by a dimension splitting twiddle size (DSTS) function for each dimension does not exceed the predetermined storage capacity, thereby restructuring memory access requirements to match the physical memory architecture;

a memory controller comprising control logic configured to dynamically load the respective set of twiddle factors corresponding to each of the dimensions into the storage memory; and wherein the processing circuit further comprises correction logic configured to:

perform the separate FFT computation for each dimension by directly accessing the respective set of twiddle factors from the physically integrated storage memory, and execute correction multiplication operations using multiplication hardware between successive dimensional FFT computations to combine results from the multi-dimensional FFT to produce a result equivalent to the N-point FFT.

2. The computing circuit of claim 1, wherein the predetermined storage capacity is smaller than required for storing all twiddle factors of the N-point FFT.

3. The computing circuit of claim 1, wherein the storage memory comprises hardware configured for single-cycle memory access operations.

4. The computing circuit of claim 1, wherein the predetermined storage capacity is up to 10 kilobytes.

5. The computing circuit of claim 1, wherein the hardware logic of the processing circuit is configured to implement Bailey's FFT algorithm for the decomposition.

6. The computing circuit of claim 1, wherein the processing circuit is configured to decompose the N-point FFT computation into a two-dimensional FFT.

7. The computing circuit of claim 1, wherein the hardware logic comprises: factorization circuitry configured to factorize the N-point FFT size into prime factors; and allocation circuitry configured to allocate each prime factor to a separate dimension of the multi-dimensional FFT.

8. The computing circuit of claim 1, wherein the control logic of the memory controller is further configured to reconfigure the storage memory with different sets of twiddle factors during execution of the multi-dimensional FFT.

9. The computing circuit of claim 1, wherein the processing circuit further comprises: optimization logic configured to determine an optimal decomposition of the N-point FFT that minimizes computational operations required for the correction multiplication operations.

10. The computing circuit of claim 1, wherein the hardware logic is configured to recursively decompose one or more of the dimensions into smaller sub-dimensions when the storage requirement determined by the DSTS function for a respective dimension exceeds the predetermined storage capacity.

11. The computing circuit of claim 1, wherein the storage memory comprises storage circuitry configured to store twiddle factors as complex numbers comprising real and imaginary components in configurable floating point precision.

12. The computing circuit of claim 1, wherein the correction logic comprises arithmetic logic units (ALUs) configured to perform the correction multiplication operations.

13. The computing circuit of claim 1, wherein the control logic comprises: pre-loading circuitry configured to load the storage memory during a planning phase prior to FFT execution; and retention circuitry configured to maintain the loaded twiddle factors for multiple FFT computations having the same dimensional structure.

14. The computing circuit of claim 1, wherein the processing circuit is configured to compute additional twiddle factors using combinations of twiddle factors stored in the storage memory, thereby enabling dimensions to exceed the predetermined storage capacity through computational generation.

15. The computing circuit of claim 1, wherein the processing circuit is configured to compute additional twiddle factors by multiplying a first twiddle factor corresponding to a first dimension with a second twiddle factor corresponding to a second dimension.

16. The computing circuit of claim 1, wherein the storage memory comprises partitioning hardware configured to partition the memory into multiple sections, each section storing twiddle factors for a different dimension of the multi-dimensional FFT.

17. The computing circuit of claim 1, wherein the hardware logic is configured to decompose the N-point FFT computation only when N exceeds the predetermined storage capacity.

18. The computing circuit of claim 1, wherein the storage memory comprises configurable memory circuitry programmable during hardware manufacturing.

19. The computing circuit of claim 1, wherein the storage memory comprises configurable memory circuitry programmable during program compilation.

20. The computing circuit of claim 1, wherein the storage memory comprises configurable memory circuitry programmable during runtime execution.

21. The computing circuit of claim 1, wherein the computing circuit is physically implemented as part of a digital signal processor (DSP) integrated circuit or graphics processing unit (GPU) integrated circuit.

22. The computing circuit of claim 1, further comprising: optimization circuitry configured to select a decomposition strategy that minimizes memory access operations while maintaining computational accuracy.

23. The computing circuit of claim 1, wherein the storage memory is physically implemented using static random access memory (SRAM) circuitry.

24. The computing circuit of claim 1, wherein the DSTS function reduces required storage through at least one of: negation properties that achieve ½ storage, conjugate symmetry properties that achieve ¼ storage, and complex multiplication properties that achieve ⅛ storage of the dimension size.

25. The computing circuit of claim 24, wherein the DSTS function rounds up a calculated storage requirement of the at least one of the negation properties, conjugate symmetry properties, and complex multiplication properties to a next integer value to accommodate the at least one of the negation properties, conjugate symmetry properties, and complex multiplication properties.

26. The computing circuit of claim 24, wherein the DSTS function calculates required storage as a square root of the dimension size when additional twiddle factors are computed through combinations of values of the twiddle factors.

27. The computing circuit of claim 1, wherein the correction logic is configured to execute the correction multiplication operations iteratively between successive dimensional computations thereby creating an interleaved sequence of dimensional FFT computations and correction operations.

28. A method for computing Fast Fourier Transforms (FFTs) using a computing circuit having storage memory physically integrated therewith, comprising:

receiving, via an input interface of the computing circuit, data for an N-point FFT computation;

determining a predetermined storage capacity of the storage memory physically integrated with the computing circuit;

decomposing, using hardware logic of a processing circuit, the N-point FFT computation into a multi-dimensional FFT having at least two dimensions, each dimension corresponding to a separate FFT computation requiring a respective set of twiddle factors, wherein a storage requirement determined by a dimension splitting twiddle size (DSTS) function for each dimension does not exceed the predetermined storage capacity, thereby restructuring memory access requirements to match physical memory architecture of the computing circuit;

dynamically loading, using control logic of a memory controller, the respective set of twiddle factors corresponding to each of the dimensions into the storage memory;

performing, using the processing circuit, the separate FFT computation for each dimension by directly accessing the respective set of twiddle factors from the physically integrated storage memory; and executing, using correction logic comprising multiplication hardware, correction multiplication operations between successive dimensional FFT computations to combine results from the multi-dimensional FFT to produce a result equivalent to the N-point FFT.

* * * * *